US008918330B1

(12) United States Patent
Winkler et al.

(10) Patent No.: US 8,918,330 B1
(45) Date of Patent: Dec. 23, 2014

(54) DISPLAY OF VIDEOS BASED ON REFERRERS

(75) Inventors: Adam Winkler, San Mateo, CA (US); Shivakumar Rajaraman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 674 days.

(21) Appl. No.: 12/690,901

(22) Filed: Jan. 20, 2010

(51) Int. Cl.
*G06Q 30/00* (2012.01)

(52) U.S. Cl.
USPC ........................................ 705/14.16; 715/716

(58) Field of Classification Search
None
See application file for complete search history.

(56) References Cited

U.S. PATENT DOCUMENTS

| | | | | |
|---|---|---|---|---|
| 2004/0230484 | A1* | 11/2004 | Greenlee .......................... | 705/14 |
| 2006/0229936 | A1* | 10/2006 | Cahill .............................. | 705/14 |
| 2007/0027768 | A1* | 2/2007 | Collins et al. .................... | 705/14 |
| 2007/0038567 | A1* | 2/2007 | Allaire et al. ................... | 705/50 |
| 2008/0082381 | A1* | 4/2008 | Muller et al. ..................... | 705/7 |
| 2008/0140666 | A1* | 6/2008 | D'Alton Harrison .............. | 707/9 |
| 2008/0243633 | A1* | 10/2008 | Spiegelman ..................... | 705/26 |
| 2008/0256233 | A1* | 10/2008 | Hall et al. ...................... | 709/224 |
| 2008/0307454 | A1* | 12/2008 | Ahanger et al. ................. | 725/36 |
| 2009/0007167 | A1* | 1/2009 | Artom ............................... | 725/9 |
| 2009/0018917 | A1* | 1/2009 | Chapman et al. ................ | 705/14 |
| 2009/0030772 | A1* | 1/2009 | Flake et al. ...................... | 705/10 |
| 2009/0037967 | A1* | 2/2009 | Barkan et al. .................. | 725/105 |
| 2009/0148124 | A1* | 6/2009 | Athsani et al. ................... | 386/46 |
| 2009/0164271 | A1* | 6/2009 | Johnson et al. .................... | 705/7 |
| 2009/0271368 | A1* | 10/2009 | Channell ........................... | 707/3 |
| 2009/0326970 | A1* | 12/2009 | Estrada et al. ..................... | 705/1 |
| 2010/0094728 | A1* | 4/2010 | Denning et al. ................. | 705/27 |
| 2010/0146077 | A1* | 6/2010 | Davies et al. .................. | 709/219 |
| 2010/0161382 | A1* | 6/2010 | Cole ............................... | 705/10 |

OTHER PUBLICATIONS

"YouTube Referrer Stats—Competitive Research," by GregWatson. com (2008). IN: Gregwatson.com. Available at: http://www.gregwatson.com/youtube-referrer-stats-competitive-research/.*
"Use Video Analytics to Drive Growth," Ooyala, Inc., 2008, 7 pages, [online] [Retrieved on Jul. 20, 2010] Retrieved from the internet <URL:http://www.ooyala.com/products/analytics>.
"Google Reader," Wikipedia, last modified on May 27, 2010, 4 pages, [online] [Retrieved on Jun. 1, 2010] Retrieved from the internet <URL:http://en.wikipedia.org/wiki/Google_reader>.
"YouTube—Wedding First Dance," by YouTube (2007), 3 pages, Screenshots from Dec. 15, 2007 from the Internet Archive. Available at: http://web.archive.org/web/20071215041011/http://www.youtube.com/watch?v=6qd_j98-y-M&feature=related.
"AOL Video—Wedding First Dance," by AOL Video (2007), 2 Pages, Screenshots from Dec. 6, 2007 from the Internet Archive. Available at: http://web.archive.org/web/20071206062846/http://video.aol.com/video-detail/tanda-wedding-first-dance-surprise-breakdance-/1928147105.
"Sports Illustrated Screenshots", by Sports Illustrated, 5 Pages, Screenshots from Dec. 9, 2007 from Internet Archive. Available at: http://web.archive.org/web/20071209040251/http://sportsillustrated.cnn.com/2007/extramustard/11/29/hotclicks.1129/index.html.

* cited by examiner

*Primary Examiner* — Daniel Kinsaul
(74) *Attorney, Agent, or Firm* — Fenwick & West LLP

(57) ABSTRACT

A system and method for determining popularity of a video based in part on requests for the video received from a referrer, grouping videos whose popularity based on requests from referrers exceeds a threshold and displaying those videos in a channel or providing them in a web feed.

21 Claims, 8 Drawing Sheets

140

Politica.com

Shark Bites Shark In Half In Australia (VIDEO)

First Posted: 10-27-09 10:22 AM | Updated: 10-28-09 01:47 PM

WHAT'S YOUR REACTION?  Google Custom Search  Search HuffPost

Inspiring | Enlightening | Infuriating | Scary | Helpful | Amazing | Innovative | Adorable

Read More: . Shark Bites Shark, Giant Shark Australia, Giant Shark Video Australia, Shark Bites Shark In Half, Video, Green News

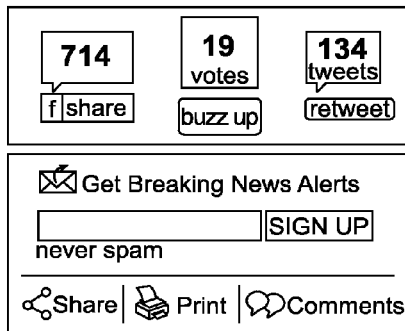

Get Breaking News Alerts

SIGN UP  never spam

Share | Print | Comments

Beachgoers near Cylinder Beach on Australia's North Stradbroke Island are understandably nervous about swimming after a great white shark was photographed biting a smaller great white nearly in half. This has led to speculation that there could be a shark as massive as 20 feet roaming the shores near the Queensland island.

One shark expert remarked: "They'll eat anything--including their own kind."

WATCH:

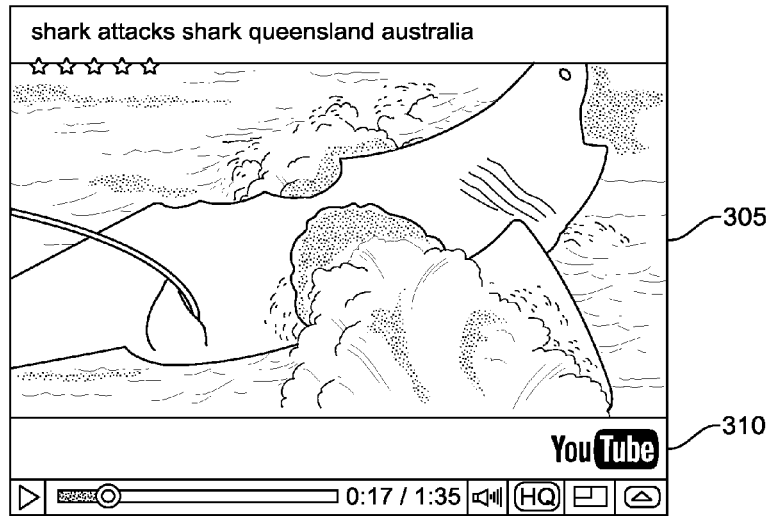

DISPLAY OF VIDEOS BASED ON REFERRERS

BACKGROUND

1. Field of the Invention

The present invention relates generally to grouping videos for presentation to users of the Internet based on the website or websites from which other users watch the videos.

2. Description of the Background Art

Various web sites exist that provide hosted video content to viewers. One such site is the YOUTUBE™ site, provided by Google Inc. of Mountain View, Calif. Typically, videos are supplied to the video hosting website by content providers, and are then made available for viewing by the public at large. A third-party website can also embed a video player configured to play a video hosted at the video hosting site. When a user at the third-party website views the embedded video, the content is provided from the video hosting site and displayed to the user in the embedded player at the third-party website. A common problem with conventional video hosting sites is that users find it difficult to discover videos that interest them. Or while, users may discover some interesting videos, there may be many more videos that they would like that that they do not discover.

SUMMARY

Embodiments of the present invention provide methods for grouping videos based on the referring websites where they are embedded. The popularity of an embedded video attributable to requests for the video via the embedded hyperlink is determined. Videos are then considered for being identified to users as associated with the referrer. Videos are grouped by genre of the videos or genre of the referrer. Additionally videos from a single referrer are grouped. The groupings of videos are displayed in channels at the video hosting site as well as available to users as a web feed.

BRIEF DESCRIPTION OF THE DRAWINGS

FIG. 3 is a screenshot of an example video embedded at third-party website.

DETAILED DESCRIPTION

The display of a video via an embedded player is logged at the video hosting site as a view of the video and the website at which is the video is embedded is similarly logged. There are third-party websites that embed many videos from video hosting sites and are popular with users for viewing videos. There are videos that are viewed disproportionately more often when embedded at a third-party web site than before they are embedded. From this data it is evident that some websites, such as for example, blogs, drive up viewership of a video when that video is embedded at that website. Internet users look to these websites as reviewers of videos on video hosting sites and the users watch those videos that are "recommended" by the fact that they are embedded in one or more pages of a particular website.

Gathering all of the videos that have been popularized by a given-third-party site or by a number of third-party sites of similar genres and displaying those on a dedicated page at the video hosting site gives users one stop to see the videos recommended by those third-party site(s). Additionally, it gives the video hosting site an additional format for attracting users. This is beneficial, for example, when selling advertising revenue.

Architecture

Figure 1:
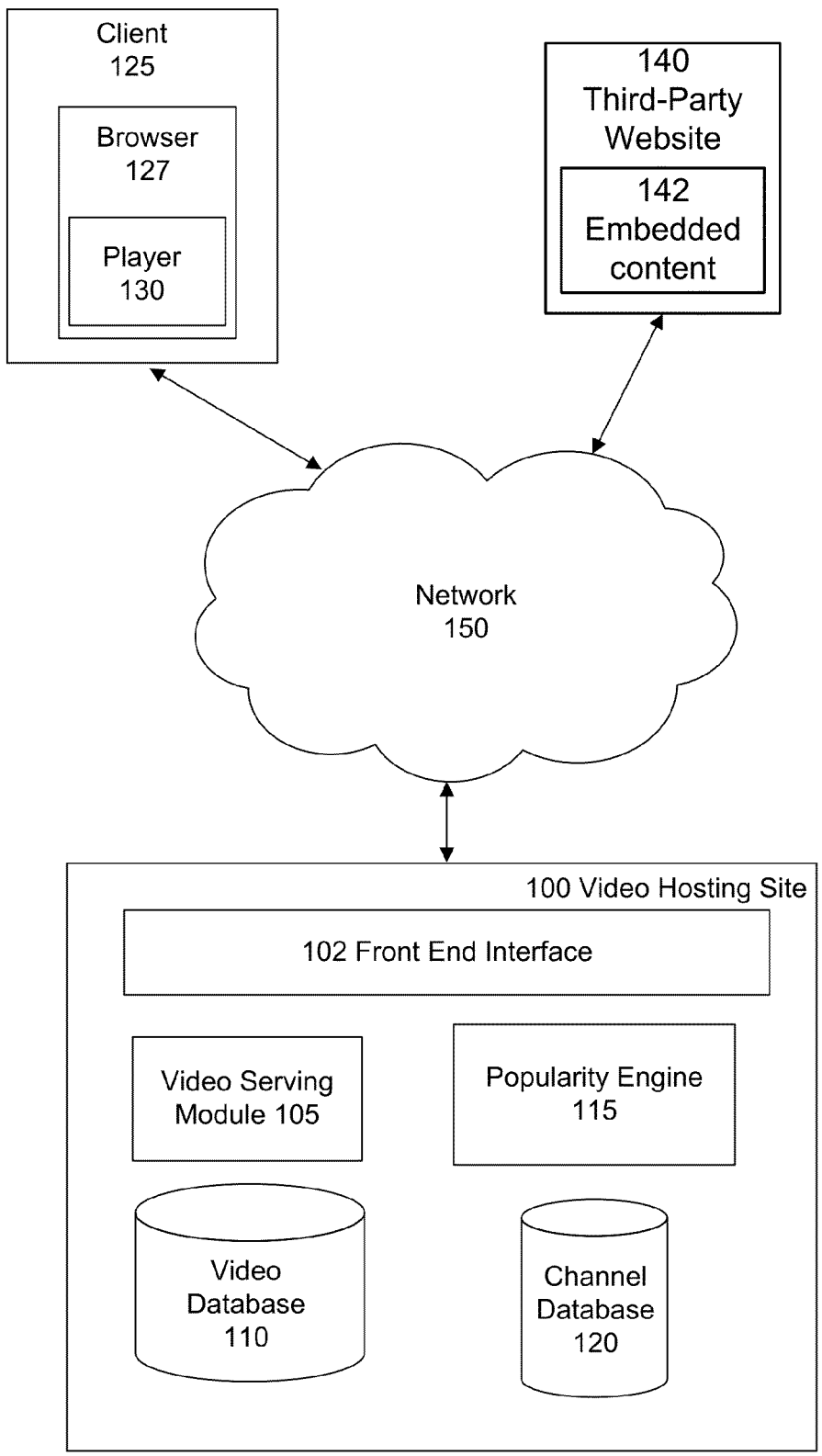
FIG. 1 is a block diagram of the overall architecture of an embodiment of the present invention.

FIG. 1 is a block diagram of the overall architecture of an embodiment of the present invention. The video hosting site 100 communicates, usually via the front end interface 102, with a website 140 and client 125 via the network 150, which is typically the Internet, but may also be any network, including but not limited to a LAN, a MAN, a WAN, a mobile, wired or wireless network, a private network, or a virtual private network, or any combination thereof. For simplicity only one website 140 and one client 125 are shown. In practice a very large numbers (e.g., millions) of clients 125 and websites 140, or as many as can be supported by the hardware and software implementation, can be in communication with the video hosting site 100 at any time. Other conventional features, such as firewalls, load balancers, authentication servers, application servers, failover servers, site management tools, and so forth are not shown so as to more clearly illustrate the features of the video hosting site 100. An example of a suitable video hosting site 100 is the YOUTUBE™ website, found at www.youtube.com. Other video hosting sites are known as well, and can be adapted to operate according to the teachings disclosed herein. The illustrated components of the video hosting site 100 can be implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the video hosting site 100 can also be performed by one or more clients 125 in other embodiments if appropriate.

The described servers can be implemented as server programs executing on server-class computers comprising a CPU, memory, network interface, peripheral interfaces, and other well known components. Of course, other types of computers can be used, and it is expected that as more powerful computers are developed in the future, they can be configured in accordance with the teachings here. The functionality implemented by any of the elements can be provided from computer program products that are stored in computer-readable storage mediums (e.g., RAM, hard disk, or optical/magnetic media) or by equivalent implementations in hardware and/or firmware.

The video hosting site 100 comprises a front end interface 102, video serving module 105, video database 110, popularity engine 115 and channel database 120. The front end interface 102 may be, for example, a web server providing web content including a user interface to client 125. The video serving module 105 retrieves videos from video database 110 and makes them available to client 125 and the website 140, for example via front end interface 102.

The video database 110 is used to store uploaded videos. Video database 110 stores video content and associated metadata provided by source of the video content, or by the operator of video hosting site 100, or by third parties. The videos have metadata associated with each file to describe characteristics of the video file or its content. For example, metadata stored may include a video ID, an ID of the user who provided the video, artist, video title, label, genre, time length, and geo-restrictions that can be used for data collection or content blocking on a geographic basis. Additionally, in the case of videos embedded on third-party web sites, video database 110 stores indicia of the third-party website on which the video is embedded (the "referrer") as well as how often the video is requested. In one example, the referrer is the complete uniform resource locator ("URL") of the web page that embeds the video. Alternatively, the referrer is the domain name of the web site that embeds the video. Various other known ways to identify the embedding entity may also be used. In various embodiments, a genre of the referrer is also stored. In one embodiment the possible genres for videos and referrers are the same. The video database 110 also stores the metrics for video popularity based on referrer volume determined by the popularity engine 115.

The popularity engine 115 determines the popularity of videos attributable to a referrer and groups of videos based on the determined popularity. The groupings in turn are stored in the channel database 120. The operation of the popularity engine 115 is discussed in greater detail in reference to FIG. 2.

The client 125 includes a browser 127 with a player 130. The client 125 views videos from video hosting site 100 using software suited for that purpose. Typically that software is a browser 127 such as Microsoft Internet Explorer, Mozilla Firefox, Apple Safari, etc. Alternatively, client-specific or site-specific software may be used. The player 130 may be a video player 130 (e.g., Flash™ from Adobe Systems, Inc.), or any other player adapted for the video file formats used in the video hosting site 100. The player 130 may be supplied by the video hosting site's 100 website or by a third-party website 140.

From a third-party website, a user accesses videos at the video hosting site 100 indirectly, via a player that displays the video as embedded content 142 that is accessed via an embedded hyperlink in the third-party website 140. A third-party website 140 can embed the same video within multiple pages of the website 140.

A user can access a set of videos directly from the video hosting site 100 by visiting the site 100 and browsing a catalog of videos, conducting searches on keywords, reviewing play lists from other users or the system administrator (e.g., collections of videos forming channels), viewing videos associated with particular user group (e.g., communities), or by directly accessing the video resource, e.g., via a URL.

Figure 2:
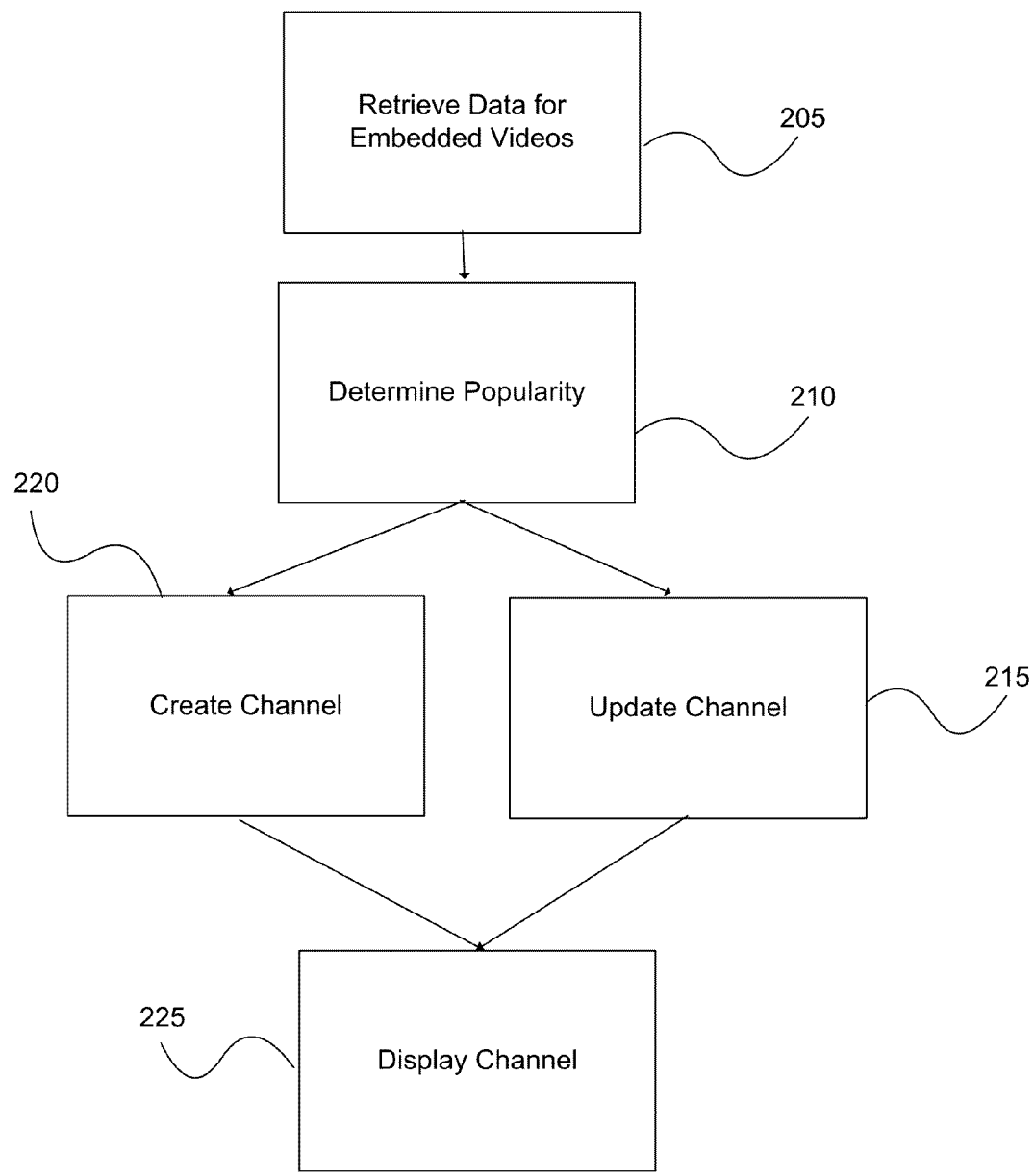
FIG. 2 illustrates a method for determining popularity of videos based on referrer volume.

FIG. 2 illustrates a method for determining popularity of videos based on referrer volume. Popularity is determined at any suitable frequency, for example hourly, daily, or monthly.

The popularity engine 115 retrieves 205, from the video database 110 for embedded videos, data including the genre of the video, the date and time of requests for the video and whether or not the requests were from a third-party website (for example, as a result of a user clicking on an embedded hyper link or as a result of the third party web site making a request for the video without user intervention). After aggregating the data, aggregate views or aggregate views subject to a percent watched threshold are determined to identify videos whose total requests from all sources exceeds a threshold and the percentage of requests from a third-party website also exceeds a threshold. The threshold for total requests and the percentage may be different for different genres of videos. For example, the threshold for total requests could be 100,000 views for Comedy videos but 10,000 for How-To & Style videos. As another example, the request from a third party website must be more than 50% of all requests. Alternatively, videos whose popularity at the video hosting site 100 increases after being frequently requested at a third-party website are identified. In yet another alternative, videos whose absolute number of requests via a third-party website exceed a threshold amount are identified. In one embodiment, 100,000 requests in a day from a single referrer is an example of a threshold above which a video is identified and considered for inclusion in a grouping based on a referrer and identified to viewers as associated with the referrer.

The popularity engine determines the rate at which a video is being requested via each referrer, the referrer rate. Additionally, the popularity engine also determines the rate at which a video is being requested from the video hosting site 100 directly, the direct rate.

The referrer rate and direct rate are used to determine the percentage of requests coming from a referrer, the referrer percentage. The referrer percentage is, for any given video and any given referrer, the percentage of total requests for the video that come from that referrer. In one embodiment, responsive to the referrer percentage exceeding a threshold or each of the referrer percentage and the direct rate exceeding a threshold, the video is identified to viewers as associated with the referrer. The association with the referrer is displayed on the page for that video at the video hosting site 100.

In one embodiment, the popularity engine creates 220 a channel on the video hosting site 110 that displays 225 videos associated with a particular referrer. One example of a referrer is a blog. Many bloggers act as reviewers of videos, either professionally or as a hobby. The opinions of many bloggers are respected and sought out by viewers of videos, but not all bloggers are equally respected. Popularity engine 115 determines which bloggers are most influential in driving video views. Videos made popular by being embedded by particular referrers are collected and identified to visitors of video hosting site 100, allowing those visitors to browse a single site and discover which videos are receiving increased attention by referrers. Video hosting site 100 may continue to include videos in the collection even after the referrer has removed the video. For example, if a news site embeds a particular video relevant to that news cycle and the video receives a large number of views, then the video may be displayed to visitors of video hosting site 100 as one that is popular on the news site. As the news cycle progresses and the news site removes the video, the information about that video's popularity may continue to be displayed to visitors of video hosting site 100. This also allows for inclusion of the video, for example, in a "What Was Popular Yesterday" section of video hosting site 100. Additionally some users may not be interested in the non-video content of the third-party website and this allows them to view the videos without wading through the rest of the website. In order to determine which of the videos associated with a referrer to display on a channel, the videos are ranked and the top ranked videos are displayed on the channel. Rankings are determined by the popularity engine and criteria for ranking includes referrer percentage and total number of requests. Alternatively, the videos are ranked by number of requests to view the video within a given period of time such as for example, the last hour or the last 5 minutes.

The popularity engine 115 also groups videos based on the video's genre. Those videos within a genre to be included are chosen based on referrer percentage and optionally direct rate even if the videos are not all requested from the same referrer. An example is sports videos. While sports websites may be a primary source for popular sports videos, such videos could also surface at a general news website or a gossip blog, for example. The genre of a video is determined by retrieving the genre of the video from the video database 110.

Alternatively, videos from multiple referrers are grouped where the referrers share a genre but the videos do not necessarily share a genre. An example would be videos popular at a plurality of politics websites. While most videos at a politics website may be considered to be in the politics genre, some may not be. One example is displayed in FIG. 3. A top video at an example politics blog, politica.com, was a video about a monster shark which would not likely be classified as being a politics video.

In an alternative embodiment, the popularity engine 115 groups the most popular videos requested via a referrer regardless of genre and regardless of the identity of the individual referrer or referrers. This list of "Most Popular" videos is an alternative to a channel of videos that are most popular when analyzing only the direct rate as is often the case when a video hosting site 100 provides a list of most popular videos.

Channels dedicated to the various groupings are created at the video hosting site 100 and videos there are identified as being associated with a particular referrer and optionally other characteristics of the grouping, such as the genre of the videos in the grouping or the genre of the referrer or referrers represented in the grouping.

The popularity engine 115 analyzes newly stored requests for videos periodically and creates new channels and updates 215 existing ones. For example, the channels could be updated hourly, daily, or weekly.

The popularity engine 115 additionally determines the effect that referrers have on the life cycle of a video. There are referrers that contribute to the overall popularity of a video soon after it is available at the video hosting site 100. Videos embedded at such referrers would start, very shortly after appearing on the video hosting site 100, with very high referrer percentages and over time, the direct rate would increase dramatically. These are early adopters or spotters of what will be a popular video. A grouping can be created of the most popular videos at such a website. Once such a website is identified, the videos to be included in such a grouping would be determined by referrer rate and referrer percentage with little to no emphasis on direct rate. Once such a video's direct rate met a threshold requirement, the video would no longer be on the cutting edge.

There are also referrers that contribute to the popularity of a video after it has been available for some period of time. These referrers discover or "surface" "sleeper" videos.

FIG. 3 is a screenshot of an example video embedded at third-party website. The video 305 is from a video hosting site 100, www.youtube.com 310, embedded at a third-party website, politica.com 140. Thus, although the video is displayed when a user views the politica.com website, the video is actually hosted from video hosting site 100 and is displayed as a result of, for example, a hyperlink on the politica.com webpage that references the video host site 100.

The same video may be embedded on multiple pages of the third-party website. In the politica.com example, the video may be embedded on the front page of the website as well as another page of the site. That page may be dedicated to news about Australia, for example. Another example is a video that multiple users of a social networking site, such as ORKUT™, have embedded at their profile pages.

Figure 4:
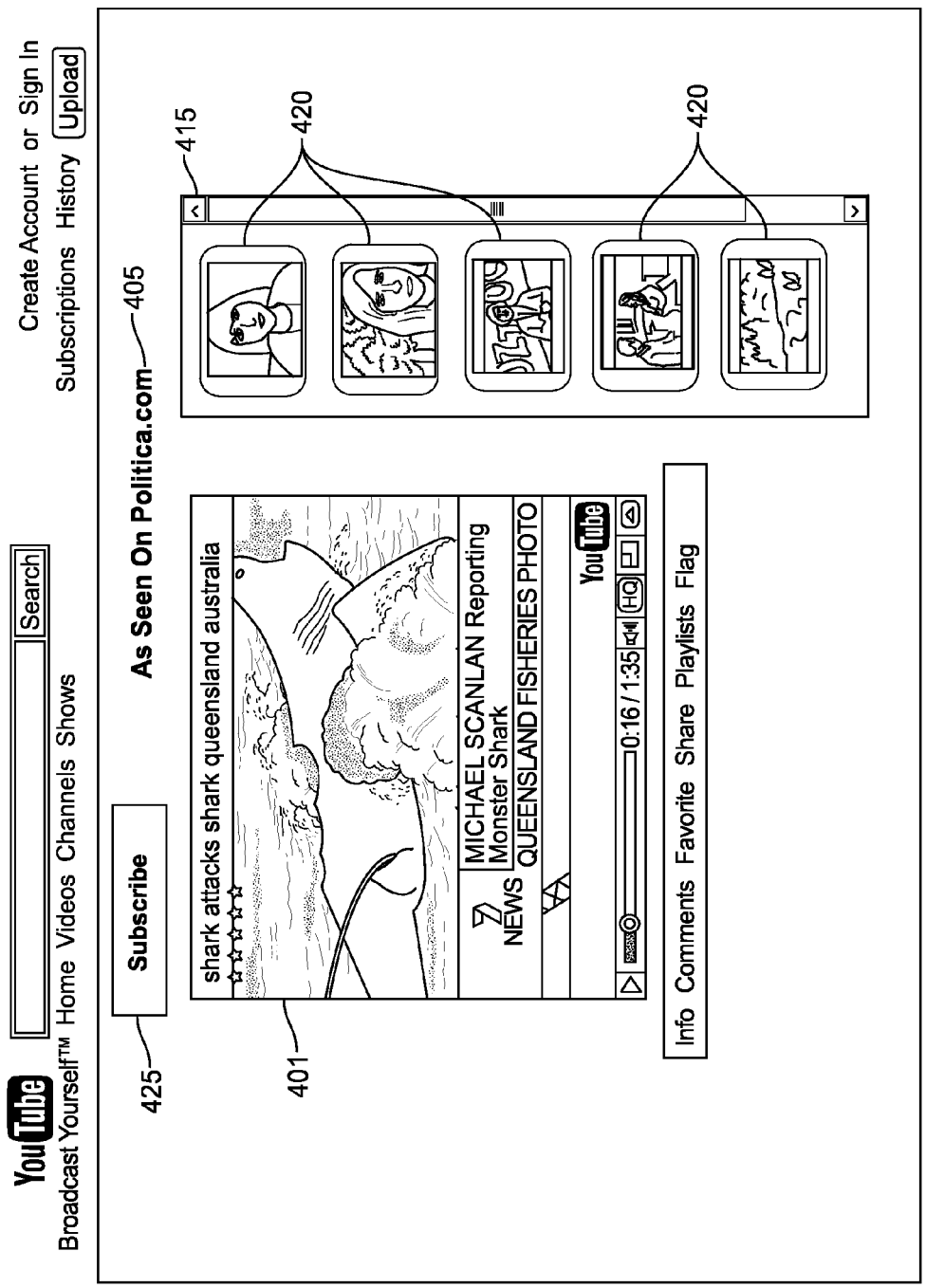
FIG. 4 is a screenshot of a channel of videos popular via embedding at a third-party website.

FIG. 4 is a screenshot of a web page served from video hosting site 100 that displays a channel of videos popular via embedding at the third-party website shown in FIG. 3, politica.com. The channel shows the third-party website embedding the videos at the top of the page 405. One video is displayed as the "lead" video 401 on the channel. That video can be the one that has had the most views in a predetermined amount of time, for example, the last hour or the last day. This way the video that is currently on the rise in popularity is easily identifiable to users. Alternatively, any other metric can be used to determine the lead video on a channel. To the side of the lead video 401 is a section 415 to browse additional videos 420 that have been categorized as popular on politica.com. As with other channels at video hosting sites 100, a user can choose to subscribe 425 to the channel that is associated with a referrer.

In an alternative embodiment, the channel is created for a group of referring third-party websites that are of the same genre. For example, there could be a sports channel for displaying the videos that are most popular on sportsillustrated.com and espn.com.

Figure 5:
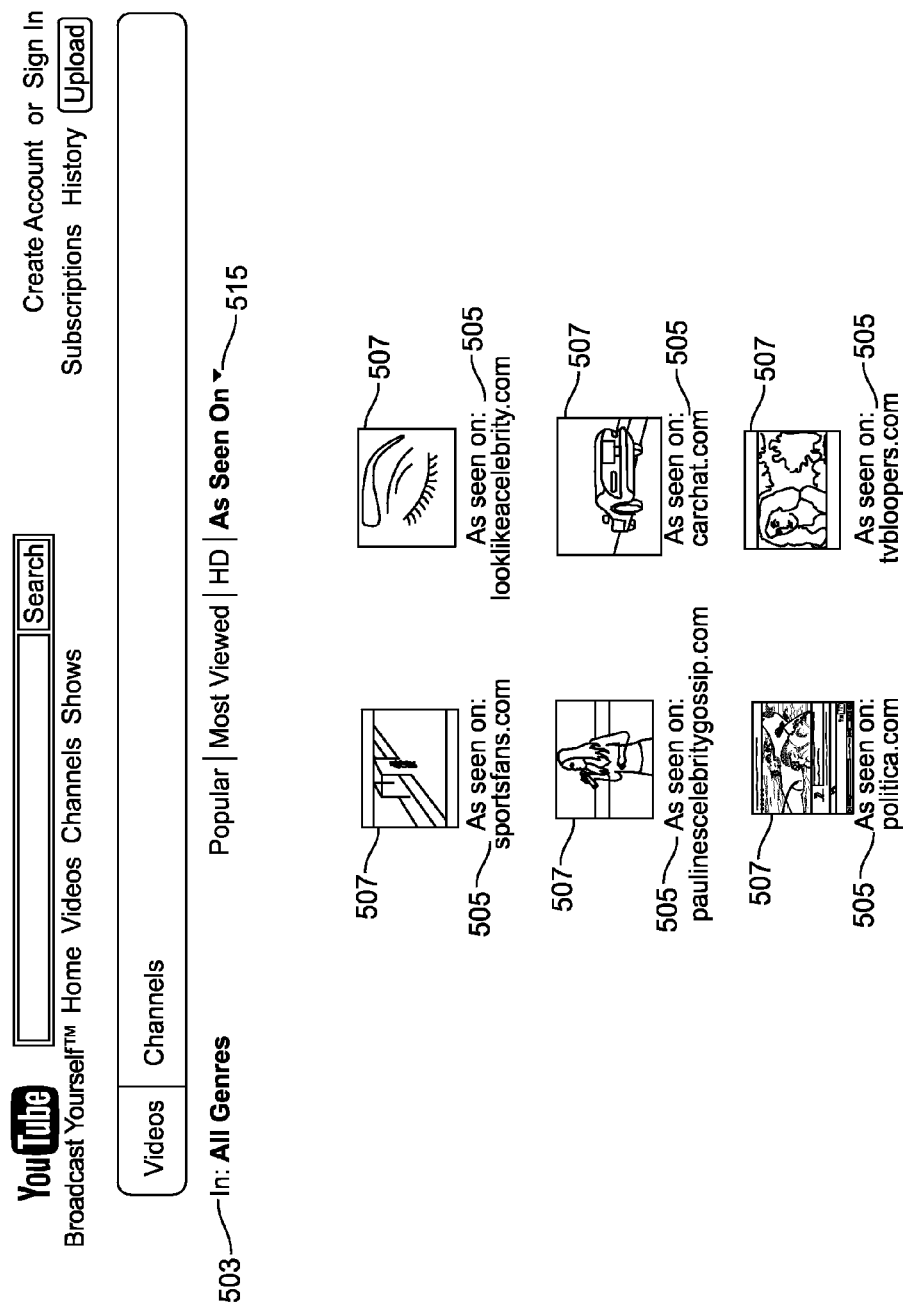
FIG. 5 is a screenshot displaying a page where users browse channels 505 dedicated to videos popular via embedding at a number of third-party websites in one embodiment.

FIG. 5 is a screenshot displaying a page where users browse channels 505 dedicated to videos popular via embedding at a number of third-party websites in one embodiment. Note that, in some embodiments, a similar page may exist for individual videos (as opposed to channels). The channels 505 displayed are from all genres 503. Each channel 505 is represented by a video 507 currently being displayed on that channel. The video 507 representing the channel 505 can be the current lead video 401 on the channel 505 or chosen randomly. Selecting one of the videos 507 representing a channel 505 opens the channel 505 for that third-party website and starts to play the representative video 507. The drop-down menu 515 allows users to switch to videos that are popular via embedding at a third-party website. Other options on the drop-down menu include videos that are top rated at the video hosting site 100 or most often listed as "favorite" by users of the video hosting site 100.

Figure 6:
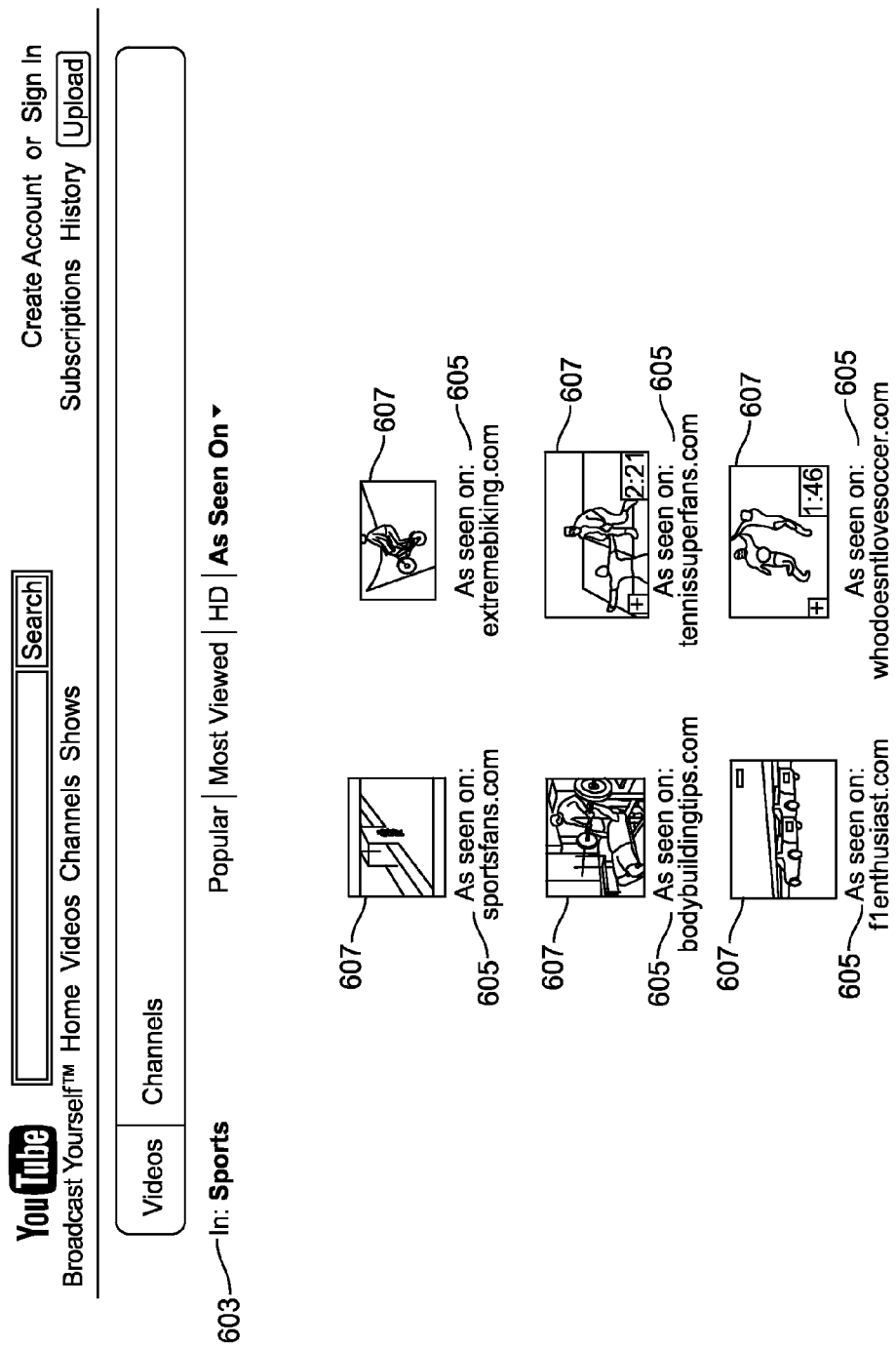
FIG. 6 is a screenshot displaying a page where users browse channels 605 dedicated to videos popular via embedding at sports-themed 603 third-party websites.

FIG. 6 is a screenshot displaying a page where users browse channels 605 dedicated to videos popular via embedding at sports-themed 603 third-party websites. Note that, in some embodiments, a similar page may exist for individual videos (as opposed to channels). Each channel 605 is represented by a video 607 currently being displayed on that channel. The video 607 representing the channel 605 can be the current lead video 401 on the channel 605 or chosen randomly. Selecting one of the videos 607 representing a channel 605 opens the channel 605 for that third-party website and starts to play the representative video 607.

Figure 7:
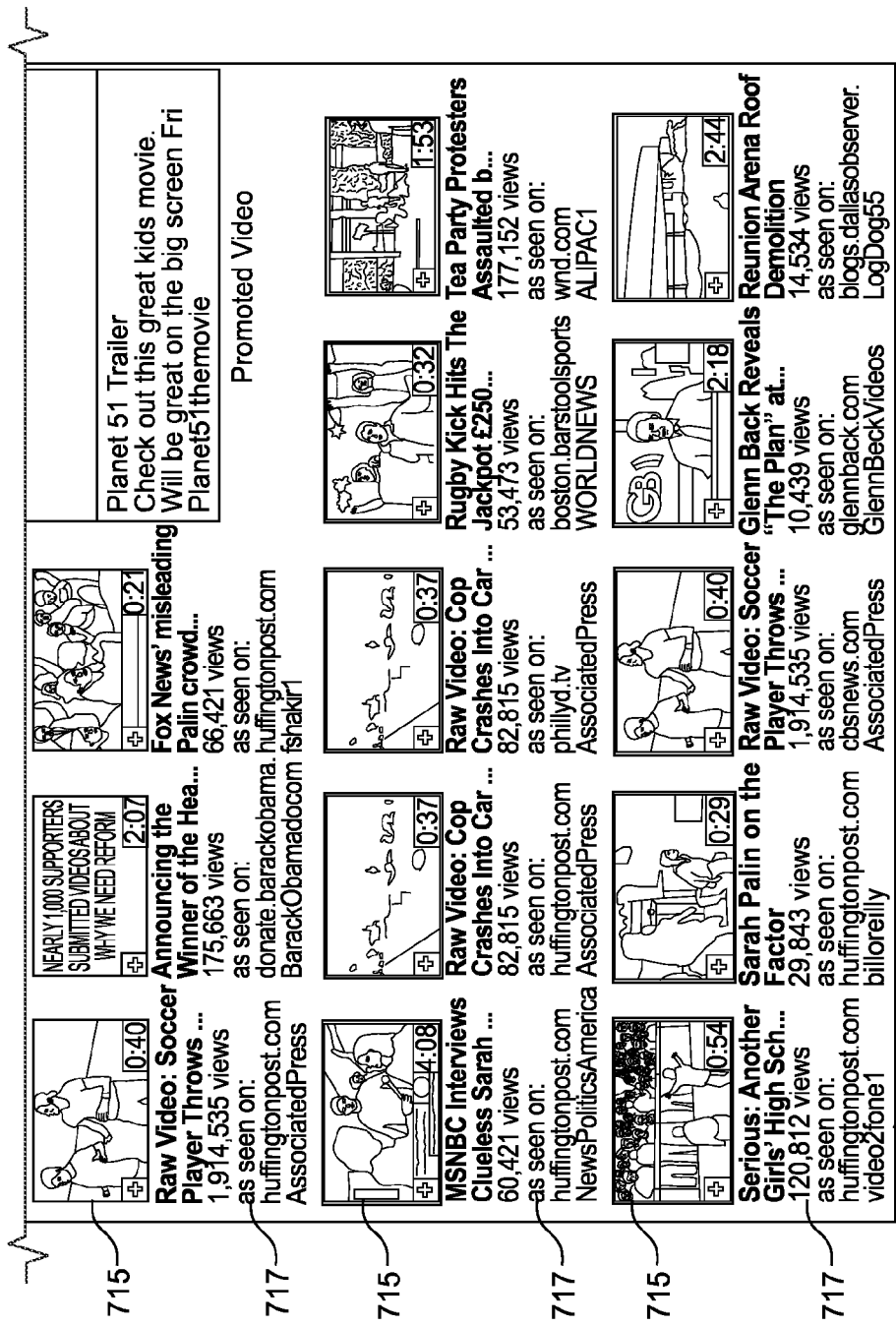
FIG. 7 is a screen shot of videos popular via embedding at a number of third-party websites displayed on a page of other videos.

FIG. 7 is a screen shot of videos popular via embedding at a number of third-party websites displayed on a page of other videos. In this embodiment, the page at the video hosting site 100 is a general page of News & Politics 705 videos. Below the display of the lead video 701 is an area 707 for the user to browse videos 715 that are popular via embedding at various third-party websites 717. The videos displayed come from various genres and are embedded at websites of various genres.

In another embodiment, the videos grouped as described previously are available to users via a web feed so that the user does not have to navigate to a website. A web feed is a data format used for providing a summary of contents on a website or a portion of the website. Examples of web feed formats are RSS feed (Really Simple Syndication, RDF Site Summary or Rich Site Summary) and Atom feed. Any web feed format may be used.

Where a user subscribes to a web feed, it is not necessary that the video hosting site 100 have created a channel dedicated to that grouping of videos. A user can subscribe to a web feed of embedded videos at any third-party website. Because the referrer for videos requested via third-party websites is logged, it is possible to provide a web feed for any referrer even if that referrer is not considered popular enough to create a dedicated channel at the video hosting site 100. The web feed would include the most popular videos requested from that third-party website. In another alternative, the user may subscribe to a web feed of the most popular videos requested from multiple third-party websites within a particular genre.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the content server 104 may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The invention claimed is:

1. A computer-implemented method for associating videos with a website on a video hosting site comprising:
   receiving a request through a third-party website to view a video over a network, wherein the video is hosted at a video hosting site and accessed indirectly via an embedded hyperlink in the third-party website;
   associating the third-party website with the video;
   determining a total number of views for the video originating from all sources and a total number of views for the video originating from the third-party website; and
   responsive to either the total number of views for the video from the third-party website exceeding a threshold or the percentage of total views originating from the third-party website in relation to the total number of views originating from all sources exceeding a threshold, displaying on a page on the video hosting site an indication of the association between the third-party website and the video on the video hosting site, wherein the indication comprises a grouping of the video based on the third-party website and an identification of the third-party website.

2. The method of claim 1 wherein the determining step further comprises determining a rate at which requests to view the video are received through the third-party website.

3. The method of claim 1 wherein the video is embedded at a plurality of web pages at the website.

4. The method of claim 1 wherein displaying an indication of the association between the third party website and the video further comprises adding the video to a channel on the video hosting site or a web feed associated with the third party website.

5. The method of claim 1 wherein the third party website is associated with a genre and displaying an indication of the association between the third party website and the video further comprises adding the video to one of a channel on the video hosting site or a web feed associated with the genre.

6. The method of claim 1 wherein the video is associated with a genre and displaying an indication of the association between the third party website and the video further comprises adding the video to one of a channel on the video hosting site or a web feed associated with the genre.

7. The method of claim 1 wherein the third party website is associated with a genre and further comprising storing the genre as associated with the video.

8. A non-transitory computer-readable storage medium with an executable program stored thereon to associate videos with a website on a video hosting site, the program when executed by a processor, causes the processor to:
   receive a request through a third party website to view a video over a network, where the video is hosted at a video hosting site and accessed indirectly via an embedded hyperlink in the third party website;
   associate the third party website with the video;
   determine a total number of views for the video originating from all sources and a total number of views for the video originating from the third party website; and responsive to either the total number of views for the video from the third party website exceeding a threshold or the percentage of total views originating from the third party website in relation to the total number of views originating from all sources exceeding a threshold, display on a page on the video hosting site an indication of the association between the third party website and the video on the video hosting site, wherein the indication comprises a grouping of the video based on the third-party website and an identification of the third party website.

9. The non-transitory computer-readable storage medium of claim 8 wherein the determining step further comprises determining a rate at which requests to view the video are received through the third party website.

10. The non-transitory computer-readable storage medium of claim 8 wherein the video is embedded at a plurality of web pages at the website.

11. The non-transitory computer-readable storage medium of claim 8 wherein displaying an indication of the association between the third party website and the video further comprises adding the video to one of a channel on the video hosting site or a web feed associated with the third party website.

12. The non-transitory computer-readable storage medium of claim 8 wherein the third party website is associated with a genre and displaying an indication of the association between the third party website and the video further comprises adding the video to one of a channel on the video hosting site or a web feed associated with the genre.

13. The non-transitory computer-readable storage medium of claim 8 wherein the video is associated with a genre and displaying an indication of the association between the third party website and the video further comprises adding the video to one of a channel on the video hosting site or a web feed associated with the genre.

14. The non-transitory computer-readable storage medium of claim 8 wherein the third party website is associated with a genre and further comprising storing the genre as associated with the video.

15. A system for associating videos with a website on a video hosting site comprising:
   a processor executing instructions which cause the processor to:
   receive a request through a third party website to view a video over a network, where the video is hosted at a video hosting site and accessed indirectly via an embedded hyperlink in the third party website;
   associate the third party website with the video;
   determine a total number of views for the video originating from all sources and a total number of views for the video originating from the third party website; and
   responsive to either the total number of views for the video from the third party website exceeding a threshold or the percentage of total views originating from the third party website in relation to the total number of views originating from all sources exceeding a threshold, display on a page on the video hosting site an indication of the association between the third party website and the video on the video hosting site, wherein the indication comprises a grouping of the video based on the third-party website and an identification of the third party website.

16. The system of claim 15 wherein the determining step further comprises determining a rate at which requests for the video are received through the third party website.

17. The system of claim 15 wherein the video is embedded at a plurality of web pages at the third party website.

18. The system of claim 15 wherein the processor is further configured, responsive to either the total number of views for the video from the third party website exceeding a threshold or the percentage of total views originating from all sources exceeding a threshold, to add the video to one of a channel on the video hosting site or a web feed associated with the third party website.

19. The system of claim 15 wherein displaying an indication of the association between the third party website and the video further comprises adding the video to one of a channel on the video hosting site or a web feed associated with the genre.

20. The system of claim 15 wherein the video is associated with a genre and displaying an indication of the association between the third party website and the video further comprises adding the video to one of a channel on the video hosting site or a web feed associated with the genre.

21. The system of claim 15 wherein the third party website is associated with a genre and the system further comprises a database to store the genre as associated with the video.

* * * * *